United States Patent
McDonald et al.

[11] Patent Number: 5,966,659
[45] Date of Patent: Oct. 12, 1999

[54] SERVICE REQUEST ROOTING BY A LOCAL RESOURCE CONTROLLER

[75] Inventors: Daniel J. McDonald; Steven E. Norwood, both of Cary; Mark L. Shaughnessy, Algonquin, all of Ill.

[73] Assignee: Motorola, Inc., Schaumburg, Ill.

[21] Appl. No.: 08/551,058

[22] Filed: Oct. 31, 1995

[51] Int. Cl.[6] .................................................. H04Q 7/20
[52] U.S. Cl. .................. 455/445; 455/11.1; 455/450; 455/509; 455/518
[58] Field of Search .................... 455/8, 53.1, 9, 455/54.1, 54.2, 56.1, 33.1, 67.1, 507, 509, 510, 515, 518, 519, 520, 521, 11.1, 445, 560; 370/338, 217, 329, 221, 58.2, 522; 379/58, 63, 211, 212, 207; 395/182.1, 182.02, 182.08, 182.09, 182.11

[56] References Cited

U.S. PATENT DOCUMENTS

| | | | |
|---|---|---|---|
| 4,481,670 | 11/1984 | Freeburg | 455/54.2 |
| 4,698,805 | 10/1987 | Sasuta et al. | 455/56.1 |
| 4,995,095 | 2/1991 | Lohrbach et al. | 455/67.1 |
| 5,229,989 | 7/1993 | Maher et al. | 455/54.1 |
| 5,245,610 | 9/1993 | Lindell | 455/54.2 |
| 5,289,525 | 2/1994 | Issenmann et al. | 455/56.1 |
| 5,305,466 | 4/1994 | Taketsugu | 455/54.1 |
| 5,371,492 | 12/1994 | Lohrbach et al. | 455/53.1 |
| 5,387,905 | 2/1995 | Grube et al. | 455/56.1 |
| 5,390,366 | 2/1995 | Kasugai | 455/56.1 |
| 5,434,854 | 7/1995 | Focarile et al. | 455/33.1 |
| 5,446,553 | 8/1995 | Grube | 455/54.1 |
| 5,448,758 | 9/1995 | Grube et al. | 455/54.1 |
| 5,450,405 | 9/1995 | Maher et al. | 370/58.2 |
| 5,457,680 | 10/1995 | Kamm et al. | 455/67.1 |
| 5,457,736 | 10/1995 | Cain et al. | 455/56.1 |
| 5,483,674 | 1/1996 | Cimet | 455/56.1 |
| 5,506,837 | 4/1996 | Sollner et al. | 455/54.2 |
| 5,507,009 | 4/1996 | Grube et al. | 455/54.2 |
| 5,548,802 | 8/1996 | Barnes et al. | 455/54.1 |
| 5,563,889 | 10/1996 | Gard et al. | 370/95.1 |
| 5,566,181 | 10/1996 | Huang et al. | 455/56.1 |
| 5,570,367 | 10/1996 | Ayanoglu et al. | 455/54.2 |
| 5,574,788 | 11/1996 | Childress et al. | 455/56.1 |
| 5,577,029 | 11/1996 | Lu et al. | 455/54.1 |

*Primary Examiner*—Andrew I. Faile
*Assistant Examiner*—Aung S. Moe
*Attorney, Agent, or Firm*—Susan L. Lukasik

[57] ABSTRACT

A local resource controller (409) from among a plurality of local resource controllers, receives a service request sourced by a communication unit (411). The local resource controller (409) selects (503) any one of at least two service controllers (301, 303, 305) where the service request is to be routed. The service request is routed to the first service controller (505) via a network (307), which is coupled to the service controllers (301, 303, 305) and the plurality of local resource controllers (409).

24 Claims, 3 Drawing Sheets

SERVICE REQUEST ROOTING BY A LOCAL RESOURCE CONTROLLER

FIELD OF THE INVENTION

This invention relates to communication systems, including but not limited to multiple-site trunked communication systems.

BACKGROUND OF THE INVENTION

The basic operation and structure of a land mobile radio system is well known. Land mobile radio systems typically comprise one or more radio communication units and one or more repeaters, also known as base stations, that transceive information via the RF communication resources. These communication resources may be narrow band frequency modulated channels, time division multiplex slots, frequency pairs, and so forth. Land mobile radio systems may be organized as trunked communication systems, where a plurality of communication resources is allocated amongst a group of users by assigning the repeaters on a communication-by-communication basis with an RF coverage area.

Currently, there is a desire to have larger communication systems that cover much larger geographic areas. Today, communication systems are known to be organized into a plurality of communication sites, as shown in FIG. 1, with a zone or network controller (ZC) attached to a bank of repeaters 103 at each of the sites S1, S2, S3, S4, S5, and S6 so that communication requests from a communication unit 105 within a coverage area 101 may be handled and organized amongst all of the sites that are connected to that zone controller. These repeaters may be intelligent repeaters, such as an IntelliRepeater™ available from Motorola, Inc., and the zone controller communicates with the intelligent repeater that is currently in control of the site. Alternatively, the repeaters may be standard repeaters with a site controller (not shown) attached to the each of the repeaters at the site, and the site controller coordinates and controls resources for the site. Although many more repeaters and sites may be present in an actual communication system, only five repeaters and six sites are shown for the sake of simplicity of the drawings. There is, however, a limit to the number of site that can be serviced by one zone controller. Consequently, a need exists for a way to cover larger areas of land while still maintaining control in a single communication system. Today, RF or wireline intersystem communication paths can be established on an as needed basis. These intersystem communication paths are established between independent communication systems, and are disconnected when no longer needed. Other systems. utilize dedicated lines that link communication systems continuously, although such an implementation is inefficient, as these dedicated lines tend to remain idle for a good part of the time.

Accordingly, there is a need for a communication system that efficiently covers a large area while maintaining centralized control for the entire area.

DESCRIPTION OF A PREFERRED EMBODIMENT

Figures 1A, 1B:
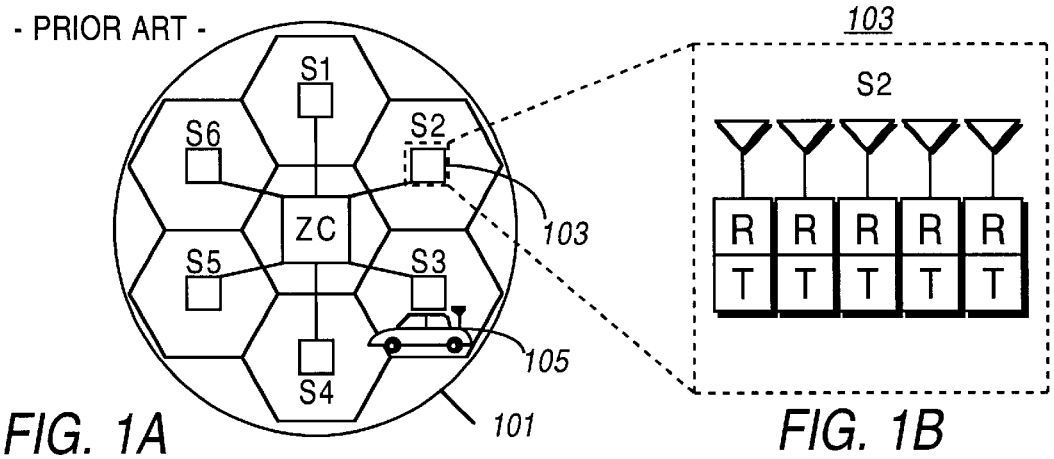
FIG. 1 is a block diagram of a multi-site communication system as is known in the art.

The following describes an apparatus for and method of distributing control and resources in a wide-area communication system. A network is used to trunk, i.e., dynamically select, multiple service controllers and a number of communication sites over a large radio frequency (RF) coverage area. The resulting system provides centralized control while maintaining efficient communications throughout a large coverage area.

The present invention provides a communication system comprising at least two service controllers 301, 303, 305. A network 307 is coupled to the at least two service controllers 301, 303, 305. A plurality of local resource controllers LRC1 through LRC18 is coupled to the network 307. The plurality of local resource controllers LRC1 through LRC18 is arranged and constructed to receive a service request from a communication unit 411 and forward the service request to any one of the at least two service controllers 301, 303, 305 via the network 307. At least one repeater from a plurality of repeaters 407 is coupled to each of the plurality of local resource controllers LRC1 through LRC18, wherein the plurality of repeaters 407 sources a plurality of communication resources.

A method, in the communication system comprising at least two service controllers, a network, a plurality of local resource controllers, and a plurality of repeaters, comprises the steps of receiving 501, by a local resource controller of the plurality of local resource controllers, a service request sourced by a communication unit. The local resource controller selects 503, from among the at least two service controllers, a first service controller where the service request is to be routed. The service request is routed to the first service controller 505.

Figure 2:
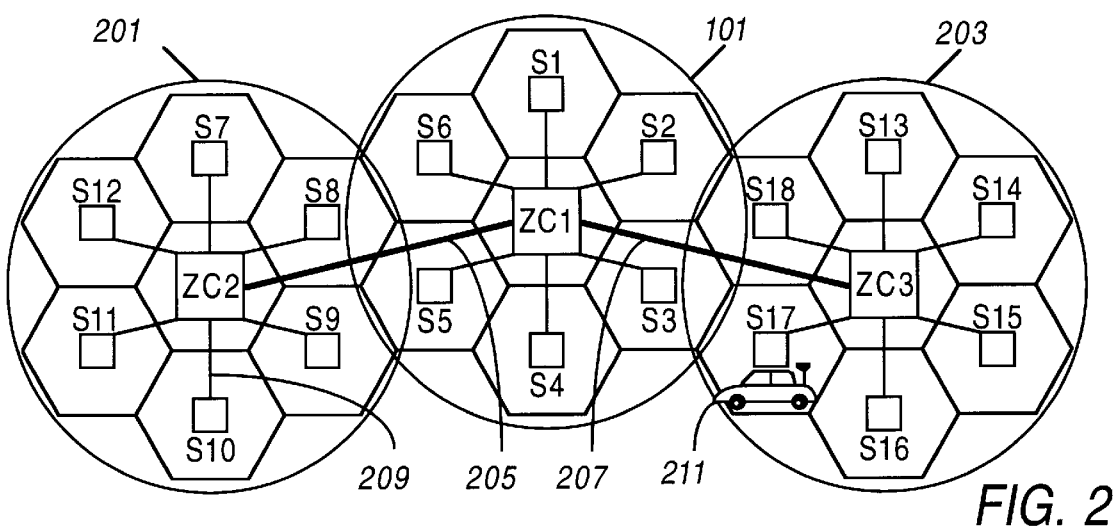
FIG. 2 is a block diagram of a multi-site communication system.

One possible configuration of the communication system that covers a larger area is shown in FIG. 2. The configuration shown in FIG. 1 is repeated multiple times in FIG. 2 to cover a larger area. In this example, three zone controllers ZC1, ZC2, and ZC3 and 18 sites S1 through S18 comprise a communication system with three contiguous coverage areas 101, 201, and 203. To maintain communications between these communication areas, called zones, additional communication links 205 and 207 are provided between the zone controllers ZC1, ZC2, and ZC3 for each zone 101, 201, and 203. Communication requests, also known as service requests or call requests, are transmitted by a communication unit 211 to a repeater in the local site S17, which repeater forwards the call for processing to the zone controller ZC3 connected to the repeaters at the site S17. As the originating zone controller, the first zone controller ZC3 communicates with the other zone controllers ZC1 and ZC2 if the service request requires communication resources to be assigned in the other zones. The first zone controller ZC3 is the controlling zone controller for this service request, and each zone controller assigns resources among the repeaters at the sites associated with each zone controller. Thus, communications can be provided to a communication unit 211 that traverses over a much larger communication area. Depending on the loading of the communication requests within such a large system, it is possible that many requests are currently being handled in one of the zones, where very few are being handled in the other zones. In such an situation, one zone is overloaded and may not be able to handle all of the communication requests, although another zone in the same system is not so burdened, because the processing load of that zone controller is below its actual capacity.

Figure 3:
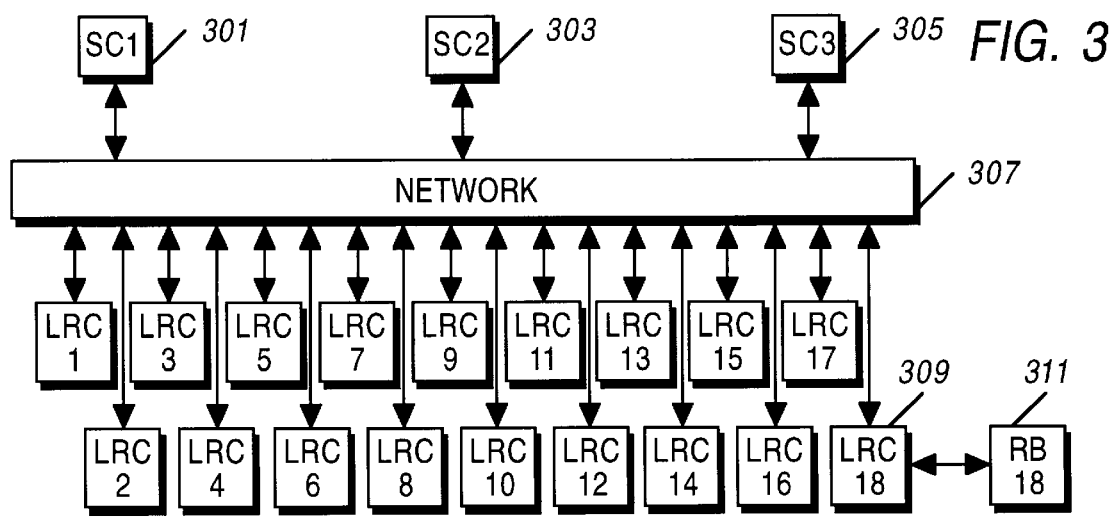
FIG. 3 and FIG. 4 are block diagrams of a multi-site communication system in accordance with the invention.

A configuration for a wide area communication system is show in FIG. 3. In this system, three service controllers 301, 303, and 305, are connected to a network 307. The service controllers are very similar to the zone controllers of FIG. 2, and a modified zone controller may be used as a service controller. The differences between these service controllers 301, 303, and 305 and zone controllers as are known in the art will be described later with respect to FIG. 5 and its associated text. The network may be a switched network, a packet network, or any other type of distributed network that can provide interconnection between many devices over a large area, such as the type of network utilized in a land-line telephone system, as is known in the art.

Also connected to the network are eighteen local resource controllers (LRC). Each local resource controller is located in a communication site within the large communication system. In the preferred embodiment, the local resource controller is a computer, such as a Motorola VME computer with a 68040 microprocessor and 64 bytes of RAM, and runs the flowcharts shown and described in the text below related to FIG. 5 and FIG. 6. Connected to each local resource controller 309 is a repeater bank 311, similar to the repeater bank 103 shown in FIG. 1. If the communication site is comprised of standard repeaters with a site controller, the local resource controller resides within the site controller, as is shown in the drawings. If the communication site is comprised of intelligent repeaters, i.e., each repeater has the ability to be a site controller, then each intelligent repeater is also provided with the capability to be a local resource controller. Although many more service controllers, local resource controllers, repeaters, and sites may be present in an actual communication system, only three service controllers, 18 local resource controllers, one repeater bank, and 18 sites are shown for the sake of simplicity of the drawings.

Communications between any of the service controllers and any of the local resource controllers are enabled by the network 307. For example, if the network is a switched circuit network, such as the integrated services digital network (ISDN) used in land-line telephone systems, the local resource controllers may send messages to any of the service controllers by first signaling into the network the address, i.e., the telephone number, of the target service controller, then, once the bearer connection is made, using that bearer connection to carry the message. Service controllers may communicate with any local resource controller in the same way. This type of network is called "connection oriented," and typically the connections are torn down during periods of non-use. As another example, the network may be a "connectionless" packet wide area network, such as those used to interconnect distributed computers. In a connectionless packet wide area network, messages may be sent between any service controller and any local resource controller by using an appropriate network protocol, such as the transport control protocol/Internet protocol (TCP/IP). In the preferred embodiment, messages are directed between points in the network through the addressing structure inherent in the network protocol. In either case, networks known in the art, whether connection oriented or connectionless, are capable of providing communications paths for connecting any points in the system as needed, for both control and user payload information.

The local resource controller 309, receives communication requests and forwards them to one of the service controllers 301, 303, and 305 via the network based on some mechanism. Because of this configuration, no particular controller need be overloaded since the local resource controller can avoid an overly burdened resource controller by simply choosing another service controller to handle the particular call. Another advantage of this configuration is that if one of the service controllers fails or is otherwise taken out of service, the remaining controllers can handle the calls for the entire system without causing an entire area of the communication system to go down. As can be seen from the configuration of the system in FIG. 2, if one of the zone controllers were to malfunction in some way, such that it could no longer process service requests, at least six sites of the communication system would be unable to provide communications, thereby reducing the size of the communication system by one third, and resulting in many service requests going unserviced. Thus, the configuration of FIG. 3 allows for any local resource controller, and hence any site to be connected to any service controller 301, 303, and 305, at any time, thereby providing a very flexible communication system.

Figure 4:
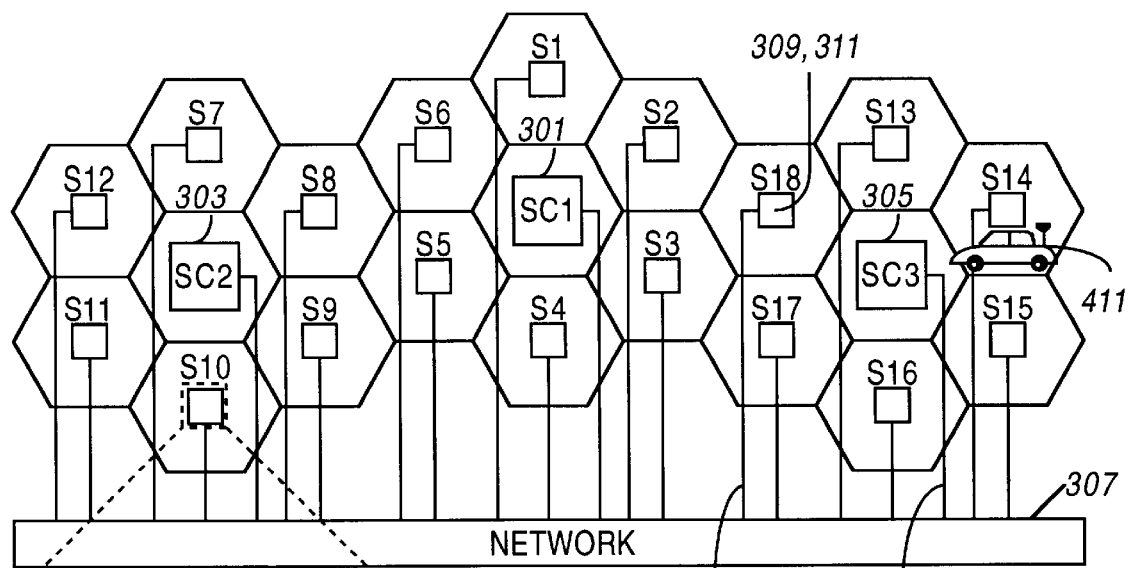

By taking the physical layout of the sites from the system diagram of FIG. 2 and converting it to the type of system as shown in FIG. 3, one resulting physical layout would appear as shown in FIG. 4. Each of the sites, as shown in FIG. 2, is still in the same location as it was before. Each site contains a repeater bank 407 and a local resource controller 409. The repeater bank 407 is connected to the local resource controller 409 by a local area wireline connection 405 in the preferred embodiment. The local resource controller 409 is connected to the network 307. Although the service controllers 301, 303, and 305 are shown in the middle of the banks of sites, they need not be located there, and in fact may be located at a distance far away from the sites, or may be located close to the sites as shown in FIG. 4. The service controllers 301, 303, and 305 may be physically located near each other and/or near the network 307.

Figure 5:
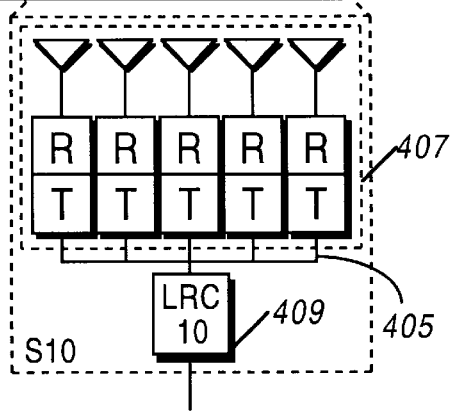
FIG. 5 is a flowchart showing service request processing in accordance with the invention.
Figure 5:
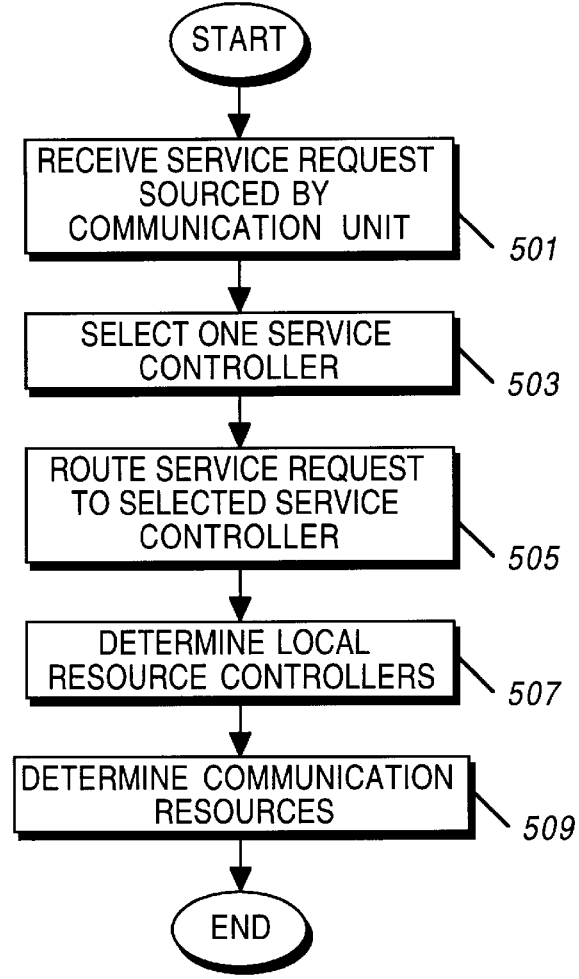

A flow chart describing service request processing by a local resource controller 409 is shown in FIG. 5. At step 501, the local resource controller 409 receives a service request that was sourced by communication unit 411. At step 503, the local resource controller selects one service controller 301, 303, 305 to handle the service requests received in step 501. The method by which the local resource controller selects the service controller is shown and described with respect to FIG. 6 and its associated text below. At step 505, the local resource controller routes, or forwards, the service request to the service controller selected in step 503. The service request may be forwarded exactly as received, may be processed or modified, and/or may have additional information added to it when the service request is forwarded to the service controller. At step 507, the selected service controller determines which of the local resource controllers are required to handle the service request. At step 509, the local resource controllers which were determined in step 507 then determine the communication resources required to place the call that is requested in the service request, as is known in the art. The service controller 301, 303, or 305 then sets up the required links in the network 307, in order to provide the local resource controllers 409 with the needed connections to complete the service request. The service controller 301, 303, or 305 would configure the network such that information from the sourcing repeater at the communication site is routed to connect all of the sources of the assigned communication resources in the call. For example, in a packet switched network, as is known in the art, the sourcing resource is told the destination address of the other resources involved in the call so that information can be routed to these destination resources. In the, preferred embodiment, the local resource controller 409 performs other functions in addition to those described herein.

A service controller is very similar to a zone controller, which is known in the art. A modified zone controller may be used as a service controller. Although one of skill in the art would be able to modify a zone controller into a service controller from the descriptions herein, a summary of some of the changes is provided here. A zone controller receives service requests from a repeater serving as a control channel at a site. If the site has a site controller instead of intelligent repeaters, then the zone controller receives service requests from the site controller. A service controller 301, 303, or 305 receives service requests from a local resource controller 409, which receives the request from the repeater serving as a control channel at the site. A zone controller directs control information for service requests to the appropriate repeaters via hardwiring from the zone controller to the repeaters at each site. A service controller 301, 303, or 305 directs control information via the network 207 to the local resource controller 307 at each site S18 where the service request will be handled. The service controller 301, 303, or 305 must appropriately control the network to provide the appropriate connection or packet route between the local resource controller 307 and the service controller 301, 303, or 305. A zone controller receives service requests only from a subset of communication sites. A service controller 301, 303, or 305 can receive communication requests from all communication sites in the communication systems, whereas a zone controller receives all communication requests from its subset of communication sites. A service controller 301, 303, or 305 receives only those communication request that will be processed by the service controller 301, 303, or 305 from each communication site. In the preferred embodiment, the service controller 301, 303, or 305 performs other functions in addition to those described herein.

Figure 6:
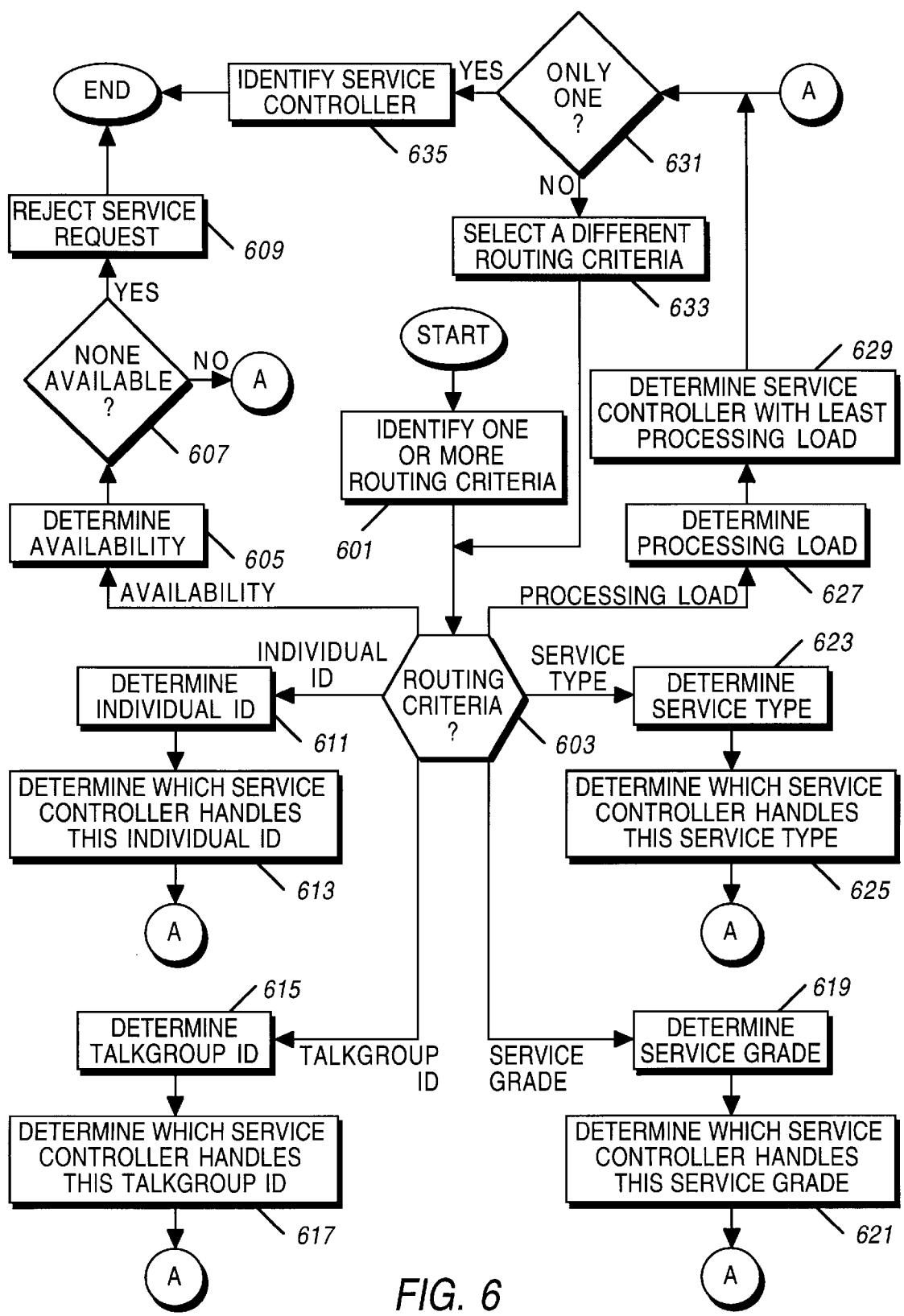
FIG. 6 is a flowchart showing selection of a service controller in accordance with the invention.

A method for determining the service controller to which a service request is to be routed in shown in FIG. 6. At step 601, one or more routing criteria are identified. At step 603, one particular routing criteria is selected. In the preferred embodiment, the routing criteria include availability of the service controller, individual ID of the communication unit sourcing the communication requests, talkgroup ID of the communication unit 411 requesting the service request, service grade of the service request, service type of the service request, and processing load of the service controllers. Other routing criteria, not shown in the drawings, include a round-robin type of assignment, wherein assignments are given to each service controller one at a time in a particular order, such as SC1, SC2, SC3, SC1, SC2, SC3, and so forth.

At step 605, availability is the selected routing criteria, and the availability of the service controllers 301, 303, 305 is determined. In the preferred embodiment, the current availability of all service controllers 301, 303, 305 is maintained and continuously updated through the network by means of standard networking techniques including, but not limited to, "sound off" network messages, network protocol acknowledgments, and network message time outs. Current controller availability includes whether or not the primary is on the network or not, and a secondary service controller may be selected. If none of the service controllers is available at step 607, the service request is rejected at step 609, and the process ends. If at step 607 there are available service controllers 301, 303, 305, then the process continues with step 631.

At step 611, the routing criteria is the individual ID of the communication unit sourcing the service request, and the local resource controller 409 determines the individual ID of the communication unit 411. At step 613, the local resource controller 409 determines which service controller handles this particular individual ID. This determination may be performed from a look-up table, such a shown in Table A. For example, one controller may cover individual ID's ranging in number form 0 to 100, whereas another controller may handle individual ID's from 0 to 4,000. The process then continues with step 631. At step 615, the routing criteria is the talkgroup ID of the communication unit requesting the service request, and the local resource controller determines the talkgroup ID of the communication unit 411 which requested the service request in step 501. At step 617, the local resource controller determines which service controller handles this particular talkgroup ID. Once again, determination of service controller for a talkgroup ID may be found in a table, such as is shown in Table A, where one controller handles group ID 0 to 200 and another controller handles talkgroup ID's from 0 to 900. The process then continues with step 631.

At step 619, the routing criteria is service grade, and the local resource controller determines the service grade requested in the service request received in step 501. Service grade includes quality of service such as fast, slow, fault tolerant, or particular controller, if a particular controller is for some reason desired. Required service grade may also be based on the communication unit's individual or talkgroup ID(s). For example, some communication units may subscribe to a better grade of service, with associated higher subscription costs, while other communication units may subscribe to a poorer grade of service, with its correspondingly lower subscription costs. At step 621, the local resource controller 409 determines which service controller handles this particular service grade. Again, this may be handled by using a look-up table, such as is shown in Table A. In the preferred embodiment, service grades are high grade and low grade. For example, an emergency would require a high grade of service, whereas a simple unimportant announcement may only require a low grade of service. In an alternate embodiment where service grade is determined by the communication unit's individual or talkgroup ID(s), the local resource controller may determine which service controller to forward the request to by using a lookup table that maps IDs to the appropriate service controller(s). At step 623, the routing criteria is service type, and the local resource controller 409 determines the service type requested by the communication unit 411 in the communication request received in step 501. Service type includes group, individual, telephone, data, video, and so forth. At step 625, the local resource controller 409 determines which service controller handles this type of service, for example as shown in Table A, and the process continues with step 631. Both service type and service grade may be considered in determining the service controller to handle a call, for example as shown in Table A, controller A handles high grade group calls and controller B handles low grade group calls. Thus, although both controllers handle group calls, and both controllers handle low grade calls, only one of the controllers handle high grade group calls.

At step 627, the routing criteria is the processing load of the service controllers 301, 303, 305, and the local resource controller 409 determines the processing load of each of these service controllers 301, 303, 305. The current load includes the dynamic processing on the call controllers, allowing for service instance-to-service instance load sharing. In the preferred embodiment, processing load, as shown in Table A, is performed on a total per service controller basis, that is, the overall processing load for each service controller 301, 303, 305 is calculated and made available to the local resource controllers 409. Alternatively, the processing load on each service controller could be calculated independently on a per service basis, thus providing the local resource controller 409 with an additional level of detail for which to make a service routing decision. For example, if the requested service has a service type of "group," the local resource controller 409 could evaluate the service controller's current processing load for the group service specifically, and not be limited to just an overall evaluation of total processor load. In this way, even if a service processor 301, 303, 305 currently has, for example, a heavy video service load, it may have spare processing capacity for the group service, thus that service controller 301, 303, 305 would not be eliminated from the selection process due to current processor load. At step 629, the local resource controller determines which service controller has the least processing load and the process continues with step 631.

At step 631, the local resource controller 409 determines if only one service controller meets the requested routing criteria. If there is only one service controller identified, that service controller is identified at step 635, and the service request is routed to that service controller in step 505. If at step 631 there is other than one service controller identified, a different routing criteria is selected at step 633, and the process continues with step 603. If a different routing criteria is selected, the local resource controller 409 may combine different routing criteria, or use them separately. For example, a particular service request may use both service type and grade of service in the determination of the service controller, or it may simply use the particular load of the service controllers at the time. In addition, it is optional to reject the communication request if the communication request does not match any of the routing criteria. For example, the communication request will not match any of the routing criteria if there is no place in Table A where the communication request fits.

Thus, the present invention provides a communication system that covers a large area while maintaining centralized control for the entire area. There is no fixed geographic arrangement of service controllers and local resources. Unlike prior art systems where all service processing for a given local resource controller and its resources is handled by the same service processor, the present invention allows service processing to be distributed as required among multiple service controllers based on a number of routing criteria. On the one hand, service processing load can thus be distributed more uniformly across service processors. And on the other, specialized service processing functions that may be costly to implement (due to higher performance, memory, fault tolerance requirements, and so forth) need not be implemented in every service processor. Instead, all requests for that specialized service, no matter from which local resource controller the communication request originates, may be routed through the network to the service processor that best supports the communication request. The capabilities described herein provide for a wide area communications system comprising a set of service processors that are well-tuned to the overall service processing needs of the entire system, rather than to the service processing needs of a particular geographic region. In addition, this system is more robust, as one service controller may totally malfunction, without leaving any of the communication sites without a controller to fulfill communication requests.

TABLE A

| | Indiv. IDs | Group IDs | Service Type | Service Grade | Current Load | Availability |
|---|---|---|---|---|---|---|
| Controller A | 0-100 | 0-200 | Group Video | High Low | Heavy | Out of Service |
| Controller B | 0-4000 | 0-900 | Group Telephone Data Video | Low Low High High | Light | In Service |
| Controller C | 4001-5000 | 901-1000 | Group | High | Light | In Service |

What is claimed is:

1. A communication system comprising:
   at least two service controllers;
   a network, coupled to the at least two service controllers;
   a plurality of local resource controllers, coupled to the network, arranged and constructed to receive a service request from a communication unit, identify at least one routing criteria of a plurality of routing criteria, select one of the at least two service controllers by applying the at least one routing criteria, and forward the service request to the selected one of the at least two service controllers via the network;
   at least one repeater from a plurality of radio frequency (RF) repeaters, coupled to each of the plurality of local resource controllers, wherein the plurality of RF repeaters sources a plurality of RF communication resources.

2. In a communication system comprising at least two service controllers, a network, a plurality of local resource controllers, and a plurality of radio frequency (RF) repeaters that source a plurality of RF communication resources, a method comprising the steps of:
   receiving, by a local resource controller of the plurality of local resource controllers, a service request sourced by a communication unit;
   identifying at least one routing criteria of a plurality of routing criteria;
   selecting, by the local resource controller, from among the at least two service controllers, a first service controller by applying the at least one routing criteria to the service request;
   routing the service request to the first service controller, such that subsequently at least one of the plurality of RF communication resources is allocated to fulfill the service request.

3. The method of claim 2, wherein the plurality of routing criteria include individual identification of the communication unit, talkgroup identification of the communication unit, service type of the service requested by the communication unit, service grade of the service requested by the communication unit, current processing load of each of the at least two service controllers, and availability of each of the at least two service controllers.

4. The method of claim 2, wherein the step of identifying comprises the step of determining, from the service request, an individual identification of the communication unit.

5. The method of claim 4, further comprising the step of determining which of the at least two service controllers handle service requests for the individual identification.

6. The method of claim 5, further comprising the step of, when two or more of the service controllers handle service requests for the individual identification, selecting a routing criteria other than individual identification of the communication unit to select the first service controller.

7. The method of claim 2, wherein the step of identifying comprises the step of determining, from the service request, a talkgroup identification of the communication unit.

8. The method of claim 7, further comprising the step of determining which of the at least two service controllers handle service requests for the talkgroup identification.

9. The method of claim 8, further comprising the step of, when two or more of the service controllers handle service requests for the talkgroup identification, selecting a routing criteria other than talkgroup identification of the communication unit to select the first service controller.

10. The method of claim 2, wherein the step of identifying comprises the step of determining a service type of the service requested by the communication unit.

11. The method of claim 10, further comprising the step of determining which of the at least two service controllers handle service requests for the service type.

12. The method of claim 11, further comprising the step of, when two or more of the service controllers handle service requests for the service type, selecting a routing criteria other than service type to select the first service controller.

13. The method of claim 2, wherein the step of selecting comprises the step of determining a service grade of the service requested by the communication unit.

14. The method of claim 13, further comprising the step of determining which of the at least two service controllers handle service requests for the service grade.

15. The method of claim 14, further comprising the step of, when two or more of the service controllers handle service requests for the service grade, selecting a routing criteria other than service grade to select the first service controller.

16. The method of claim 2, wherein the step of selecting comprises the step of determining the current processing load of each of the at least two service controllers.

17. The method of claim 16, further comprising the step of determining which of the at least two service controllers a current processing load, thereby yielding the first service controller.

18. The method of claim 2, wherein the step of selecting comprises the step of determining an availability of each of the at least two service controllers.

19. The method of claim 18, further comprising the step of rejecting the service request if all of the at least two service controllers are unavailable.

20. The method of claim 2, further comprising the step of rejecting the service request if none of the plurality of routing criteria applies to the service request.

21. The method of claim 2, further comprising the step of determining which of the plurality of local resource controllers is needed to complete the service request and routing service instructions to those local resource controllers.

22. The method of claim 21, further comprising the step of determining, by the local resource controllers needed to complete the service request, what communication resources are needed to be assigned to support the service requested by the communication unit.

23. In a communication system comprising at least two service controllers, a network, a plurality of local resource controllers, and a plurality of repeaters that source a plurality of communication resources, a method comprising the steps of:

receiving, by a local resource controller of the plurality of local resource controllers, a service request sourced by a communication unit;

identifying at least one of a plurality of routing criteria;

selecting, by the local resource controller, from among the at least two service controllers, a first service controller by applying the at least one of the plurality of routing criteria to the service request;

routing the service request to the first service controller;

determining which of the plurality of local resource controllers is needed to complete the service request and routing service instructions to the local resource controllers needed to complete the service request; and determining, by the local resource controllers needed to complete the service request, what communication resources are needed to be assigned to support the service requested by the communication unit.

24. The method of claim 23, wherein the plurality of routing criteria include individual identification of the communication unit, talkgroup identification of the communication unit, service type of the service requested by the communication unit, service grade of the service requested by the communication unit, current processing load of each of the at least two service controllers, and availability of each of the at least two service controllers.

* * * * *

UNITED STATES PATENT AND TRADEMARK OFFICE
CERTIFICATE OF CORRECTION

PATENT NO.    : 5,966,659
DATED         : October 15, 1999
INVENTOR(S)   : McDonald et al.

Page 1 of 1

It is certified that error appears in the above-identified patent and that said Letters Patent is hereby corrected as shown below:

Column 8,
Line 24, delete first instance of "routing criteria".
Line 24, delete "," after the second instance of "criteria".
Line 25, delete "by".
Line 26, delete "applying the at least one routing criteria".
Line 29, delete "radio frequency".
Line 30, delete "(RF)".
Lines 31 and 32, delete "RF".
Line 35, delete "radio frequency (RF)".
Line 36, delete "that source a plurality of RF communication resources".
Line 41, delete "routing criteria".
Line 42, after "criteria", insert -- by which to select a first service controller --.
Line 45, after controller, insert -- where the service request is to be routed --.
Lines 46-47, delete "by applying the at least one routing criteria to the service request".
Line 48, after "controller" delete "," and insert -- . -- in place thereof.
Lines 49-51, delete "such that subsequently at least one of the plurality of RF communication resources is allocated to fulfill the service request".

Column 9,
Line 25, before "select" insert -- by which to select a first controller, --.
Line 38, delete the second instance of "the" and insert -- a -- in place thereof.
Line 42, delete "a" and insert -- has the least -- in place thereof.

Signed and Sealed this

Nineteenth Day of March, 2002

Attest:

*Attesting Officer*

JAMES E. ROGAN
*Director of the United States Patent and Trademark Office*